US009114393B2

(12) United States Patent
Rodoni et al.

(10) Patent No.: US 9,114,393 B2
(45) Date of Patent: Aug. 25, 2015

(54) DISPOSABLE DISPENSING CARTRIDGE FOR MEDICAL ASSAY INSTRUMENTATION

(75) Inventors: Michele Rodoni, Murten (CH); Antonio Yanez, Salavaux (CH)

(73) Assignee: SYMBION MEDICAL SYSTEMS SARL, Avenches (CH)

( * ) Notice: Subject to any disclaimer, the term of this patent is extended or adjusted under 35 U.S.C. 154(b) by 387 days.

(21) Appl. No.: 13/070,803

(22) Filed: Mar. 24, 2011

(65) Prior Publication Data

US 2011/0243815 A1    Oct. 6, 2011

(30) Foreign Application Priority Data

Apr. 6, 2010 (EP) ..................... 10159118

(51) Int. Cl.
*B01L 3/00* (2006.01)
*G01N 21/75* (2006.01)
(Continued)

(52) U.S. Cl.
CPC ........... *B01L 3/0265* (2013.01); *B01F 11/0017* (2013.01); *B01F 11/0266* (2013.01);
(Continued)

(58) Field of Classification Search
CPC ............ B01F 11/0017; B01F 11/0266; B01F 2003/0028; B01F 13/0059; B01L 2200/0621; B01L 2200/0684; B01L 2200/16; B01L 2300/021; B01L 2300/022; B01L 2300/0838; B01L 2400/0487; B01L 2400/0611; B01L 2400/0638; B01L 3/0265; B01L 3/523; B01L 2300/0816; B01L 2300/0636; B01L 3/502715; B01L 2400/0478; B01L 3/5027; B01L 7/52; B01L 3/502738; B01L 2400/0442; B01L 2400/0481; B01L 2400/0677; B01L 7/525; B01L 2200/10; B01L 2300/0877; B01L 2400/0439; B01L 3/50273; B01L 2200/04; B01L 2300/14; B01L 2400/0633; B01L 3/0293; B01L 9/527; B01L 2300/0681; B01L 2300/0864; B01L 2300/0867; B01L 2300/1822; B01L 2300/024; B01L 2300/069; B01L 2300/087; B01L 2400/0605; B01L 2400/0644; B01L 2400/065; B01L 2400/0661; B01L 2400/0683; B01L 3/0268; B01L 3/5025; B01L 2200/027; B01L 2200/0689; B01L 2200/082; B01L 2300/0803; B01L 2300/0809; B01L 2300/0861; B01L 230/0883; B01L 2300/1805; B01L 2400/0406; B01L 2400/0409; B01L 2400/0436; B01L 2400/049;

B01L 2400/0616; B01L 2400/0655; B01L 2400/0688; B01L 3/5023; B01L 3/502707; B01L 3/502723; B01L 3/502746; B01L 3/502753; B01L 99/00; G01F 11/28; C12Q 2565/629; G01N 2035/00158; G01N 1/312; G01N 33/54386; G01N 2001/021; G01N 2035/00326; G01N 35/1097; B01J 2219/0036; B01J 2219/00477; B01J 2219/00533; B01J 2219/00659; B01J 19/0046; B01J 2219/00378; B01J 2219/00698
USPC .................. 422/401, 547, 554, 555, 561, 617
See application file for complete search history.

(56) References Cited

U.S. PATENT DOCUMENTS 3,901,272 A * 8/1975 Banners et al. ............ 137/513.5
(Continued)

FOREIGN PATENT DOCUMENTS

CN       1976868       6/2007
(Continued)

OTHER PUBLICATIONS

Chinese Office action dated Feb. 2, 2013 for application CN201110081844.
(Continued)

*Primary Examiner* — Dean Kwak
(74) *Attorney, Agent, or Firm* — Pearne & Gordon LLP

(57) ABSTRACT

A disposable dispensing cartridge comprises a reservoir adapted to contain a solution to be dispensed; a chamber in fluidic communication with the reservoir through a first unidirectional valve. The chamber comprises an outlet portion with a second unidirectional valve allowing passage of the solution out of the chamber. The disposable cartridge is connectable via a second connecting portion to a pressurizing device. The pressurizing device is adapted to apply a reduced pressure within the chamber; drawing a predetermined volume of solution from the reservoir, through the first unidirectional valve, into the chamber; and to apply a raised pressure within the chamber, drawing the determined volume of solution out of the chamber, through the second unidirectional valve. The second connecting portion comprises a check valve being arranged to allow gas, but not the solution, to flow in and/or out of the chamber via the second connecting portion. The disposable cartridge is simple and inexpensive to manufacture.

16 Claims, 1 Drawing Sheet

(51) Int. Cl.
*A61J 1/06* (2006.01)
*B01L 9/00* (2006.01)
*B01L 3/02* (2006.01)
*B01F 11/00* (2006.01)
*B01F 11/02* (2006.01)
*G01F 11/28* (2006.01)
*B01F 3/00* (2006.01)

(52) U.S. Cl.
CPC ............. B01L 3/523 (2013.01); G01F 11/28 (2013.01); *B01F 2003/0028* (2013.01); *B01L 2200/0621* (2013.01); *B01L 2200/0684* (2013.01); *B01L 2200/16* (2013.01); *B01L 2300/021* (2013.01); *B01L 2300/022* (2013.01); *B01L 2300/0838* (2013.01); *B01L 2400/0487* (2013.01); *B01L 2400/0611* (2013.01); *B01L 2400/0638* (2013.01)

(56) References Cited

U.S. PATENT DOCUMENTS 6,193,933 B1 * 2/2001 Sasaki et al. .................. 422/64
2001/0044603 A1 * 11/2001 Harrold ........................ 604/152
2006/0160205 A1 * 7/2006 Blackburn et al. ......... 435/287.2
2009/0269248 A1 * 10/2009 Falb et al. .................... 422/102

FOREIGN PATENT DOCUMENTS

| | | |
|---|---|---|
| EP | 1425087 | 6/2004 |
| JP | 62271893 | 11/1987 |
| JP | 63286770 | 11/1988 |
| JP | 2002357512 | 12/2002 |
| JP | 2004518129 | 6/2004 |
| JP | 2007508525 | 4/2007 |
| JP | 2010066265 | 3/2010 |
| WO | 2005/019092 A2 | 3/2005 |
| WO | WO2005/019092 | 3/2005 |
| WO | 2006/048643 A1 | 5/2006 |
| WO | WO2006048643 | 5/2006 |
| WO | 2007/122387 A2 | 11/2007 |
| WO | WO2007122387 | 11/2007 |

OTHER PUBLICATIONS

Japanese Office action dated Jan. 22, 2013 for application JP2011083363.

* cited by examiner

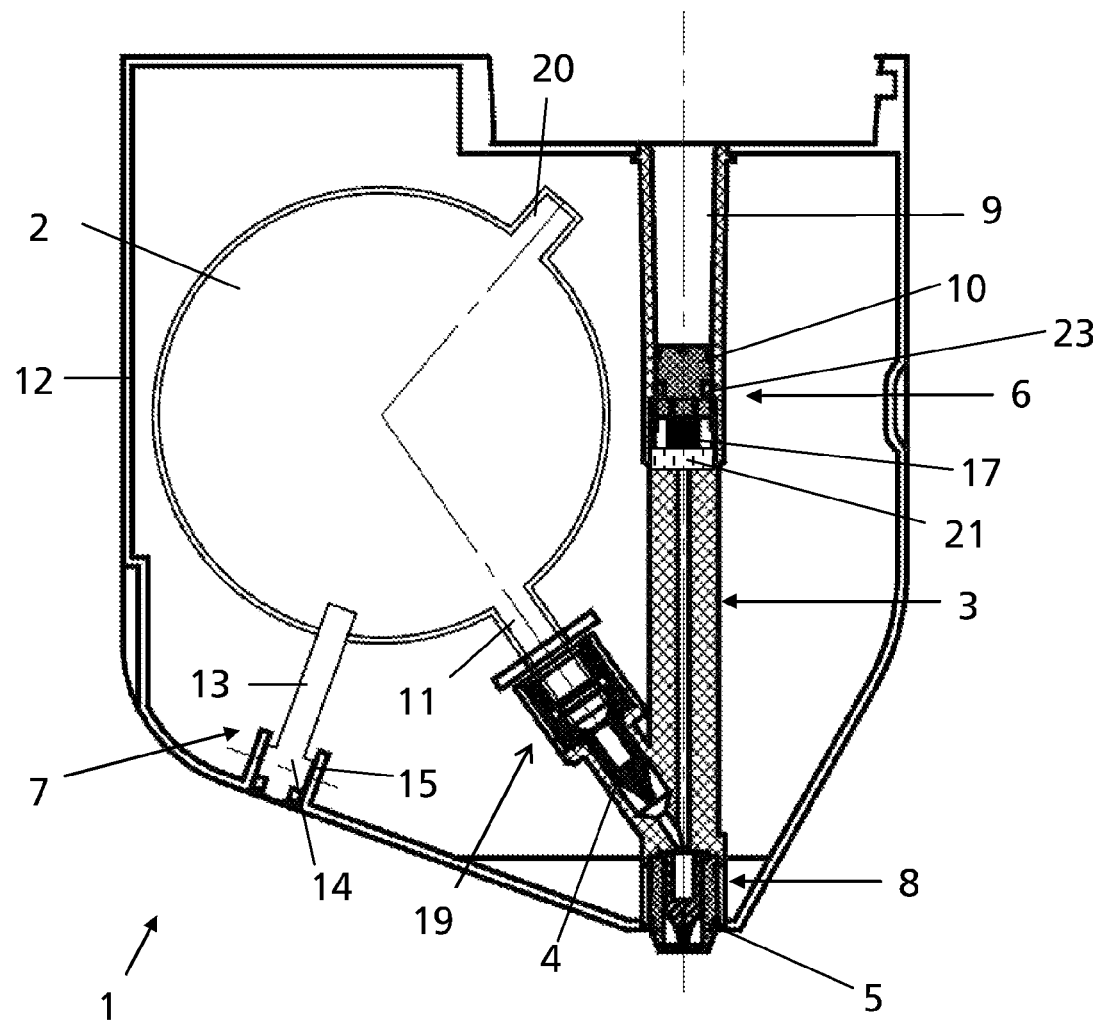

DISPOSABLE DISPENSING CARTRIDGE FOR MEDICAL ASSAY INSTRUMENTATION

FIELD

The present invention concerns a disposable dispensing cartridge, more particularly to a disposable cartridge for medical assay instrumentation such as immunoassays that is simple and inexpensive to manufacture.

BACKGROUND

Medical assay instrumentation requires the use of reagents and/or samples, such as blood samples in immunoassays, stored in a machine and added to a prepared sample. In typical medical assay instrumentation, a prepared sample is added to a cuvette or other vessel mounted on the machine. The particular reagent required for the given test is brought on station from a tray, or carousel, containing a number of different reagents. Whilst on station, the reagent container is opened, and a pipette inserted into the reagent in order to withdraw a volume of fluid. The pipette is then moved by the machine into a position directly above the cuvette and the required volume of reagent is typically dispensed into the cuvette by a positive displacement pump, for example, a syringe driven by a stepper motor. Following the dispensing of the reagent, the pipette is then moved off station, and the pipette tip is washed and rinsed, or alternatively discarded in the case of a disposable pipette. This dispensing process is complex and expensive, particularly where the pipette is washed and rinsed following each dispense of reagent. Furthermore, the machine is required to move the pipette from the reagent container to the cuvette and then to a further position at which the pipette is washed. This movement adds to the complexity of the machine, leading to an increased risk of component failure. Additionally, the movement of the machine leads to a long cycle time for each of the reagent dispenses. This in turn limits the throughput of the machine, and thereby the speed with which the laboratory can return the test results to the health care professionals.

A known solution to this problem is to provide a cartridge which contains both a reservoir of reagent and a multi-use dispense tube. This solution is advantageous in that the dispense tube does not need to be washed or discarded after each dispense. Also, the movement of the machine is limited to the delivery of the required cartridge to a dispense station. As soon as the delivery of reagent is completed, the next reagent cartridge can be brought into position.

In WO 2005/019092, a reagent dispensing cartridge includes a reagent reservoir, a reagent dispensing assembly in communication with the reagent reservoir and an actuator assembly. The reagent dispensing assembly includes a reagent metering chamber, a piston moving within the metering chamber, and two spring loaded one-way ball valves. The reagent reservoir includes a collapsible fluid bladder supported in a rigid cover. Piston displacement in one direction causes an amount of fluid to enter the metering chamber through the valve positioned between the fluid reservoir and the metering chamber, and piston displacement in the other direction propels the fluid out of the metering chamber. The dispensing cartridge is however complex to fabricate and is not disposable.

WO 2006/048643 discloses a dispensing system dispensing sub-milliliter volumes of reagent and comprising a cartridge, an armature and a nozzle assembly. The cartridge comprises a hollow body, which is divided into a first chamber and a second chamber by a valve seat. The first chamber forms a reservoir which, in use, retains reagent to be dispensed by the system. The second chamber defines an axial armature bore within which the armature can move. The nozzle assembly retains the armature in the bore. The reagent dispensing system also includes a solenoid coil of conventional construction having a bore. The second chamber of the cartridge is adapted to be mounted within the bore, thereby enabling the magnetic field generated by the coil to move the armature. Movement of the armature causes reagent from the reservoir to be expelled through the nozzle assembly. Here, the disposable parts including the cartridge, armature and nozzle assembly are rather complex and expensive to manufacture.

The reagent cartridge disclosed in patent number WO 2007/122387 comprises a reagent reservoir in fluid communication with a deformable dispense tube that is a least partially compressible to dispense a known volume of reagent from the tube. Compression of the tube is performed by a hammer actuated by a piezoelectric actuator. Despite its simplicity, the disposable cartridge is not convenient in use. Indeed, since the tube has a very small internal diameter, the volume of fluid dispensed by a single strike of the tube is in the order of 100 nanoliters. Dispensing larger volumes of reagent requires cycling the hammer, possibly slowing down the dispensing operation. Moreover, dispensing accurate volumes of reagent requires the carefully alignment of the tube with the hammer, an operation that must be performed for each cartridge and requires specific skills form the operator.

SUMMARY

The present application discloses a disposable dispensing cartridge which overcome at least some limitations of the prior art.

According to the embodiments, a disposable dispensing cartridge can comprise: a reservoir adapted to contain a solution to be dispensed; a chamber in fluidic communication with the reservoir through a first unidirectional valve, the chamber comprising an outlet portion and a second connecting portion, the outlet portion comprising a second unidirectional valve allowing passage of the solution out of the chamber; wherein the disposable cartridge is connectable via the second connecting portion to a pressurizing device, the pressurizing device being adapted to apply a reduced pressure within the chamber, drawing a predetermined volume of solution from the reservoir, through the first unidirectional valve, into the chamber; and to apply a raised pressure within the chamber, drawing the determined volume of solution out of the chamber, through the second unidirectional valve; and wherein the second connecting portion comprises a check valve being arranged to allow gas, but not the solution, to flow into and/or out of the chamber via the second connecting portion.

In an embodiment, the check valve can be a membrane that is impermeable to liquids but gas permeable.

In another embodiment, the check valve can further comprise a movable part loaded with a compression spring being arranged such as to block or open the passage to gas when the pressurizing device is respectively disconnected from, or connected to the disposable cartridge.

In yet another embodiment, the reservoir can be removably attached to the chamber.

In yet another embodiment, the reservoir can comprise a spout that can be fitted into a first connecting portion of the chamber to attach the reservoir to the chamber.

In yet another embodiment, the first unidirectional valve can be comprised in the first connecting portion.

In yet another embodiment, the reservoir can comprise a flexible portion adapted to be deformed upon said drawing a predetermined volume of solution from the reservoir to equalize pressure within the reservoir. The reservoir can be a flexible bag.

In yet another embodiment, the disposable cartridge can further comprise an agitating device being arranged for agitating the solution contained within the reservoir.

In yet another embodiment, the agitating device can comprise an excitation device and a rod excited by the excitation device such as to vibrate the reservoir.

In yet another embodiment, the rod can be a magnetic rod having two opposed poles and the excitation device is an excitation coil.

In yet another embodiment, the rod can be L-shaped and one portion of the rod is arranged within the excitation coil such that the other portion is rotated when the excitation device is activated.

In yet another embodiment, the first and second unidirectional valves can be duck-bill valves.

In yet another embodiment, the chamber can be a capillary tube.

In yet another embodiment, the chamber can be adapted to retain a predetermined volume of solution comprised between 10 µl and 100 µl.

The disposable cartridge disclosed herein does not include the pressurizing device or any mechanism for drawing the solution into and out of the chamber, and is therefore simple and inexpensive to manufacture. Moreover, the disclosed disposable cartridge is suitable for effectively delivering rapidly volumes of solution required in typical medical assay instrumentation, for example, dispensing solution volumes in the range comprised between 10 µl and 100 µl.

BRIEF DESCRIPTION OF THE DRAWINGS

The invention will be better understood with the aid of the description of an embodiment given by way of example and illustrated by FIG. 1 which represents a disposable dispensing cartridge according to an embodiment.

DETAILED DESCRIPTION OF POSSIBLE EMBODIMENTS

FIG. 1 represents a cross-section view of a disposable dispensing cartridge 1 according to an embodiment. The disposable cartridge 1 comprises a reservoir 2 to be filled with a solution such a reagent or a sample, and a chamber 3 having a fixed volume. The chamber 3 is in fluidic communication with the reservoir 2 through a first unidirectional valve 4 allowing passage of solution from the reservoir 2 into the chamber 3, but not in the reverse direction.

In the embodiment of FIG. 1, the reservoir is a flexible reservoir 2, for example, made from a flexible layer material such as a polymeric film welded around its borders to form a bag. The reservoir 2 comprises a spout 11, preferably made of a rigid material. The spout 11 is connected to the chamber 3 such that the reservoir 2 can be removable attached to the chamber 3. In the example of FIG. 1, the flexible reservoir 2 is removably attached to the chamber 3 by fitting the spout 11 into a first connecting portion 19 in fluidic communication with the chamber 3, the first connecting portion 19 comprising the first unidirectional valve 4. The reservoir 2 can be filled with the solution through the spout 11 or through a separate plug 20 which seals an aperture in the flexible reservoir 2. When the solution is drawn into the chamber 3, the flexible reservoir 2 collapses in a controlled manner until the solution can be substantially evacuated.

An advantage of the cartridge configuration comprising the removably attached reservoir 2 is that the solution in the reservoir 2 does not come in contact with air, or with a gas, when a volume of solution is drawn into the capillary tube 3 during a dispensing operation. Moreover, the solution can be easily changed in the dispensing cartridge 1, if required.

Other configurations of the reservoir 2 are also possible. For example, the reservoir 2 can comprise a rigid portion and a flexible portion in order to provide a variable volume of the solution within the reservoir 2 without the need of air or gas intake in the reservoir 2 during dispensing. For example, the reservoir 2 can comprise a deformable diaphragm (not shown) and/or a bellows (also not shown) adapted to be deformed, or collapsed, in accordance with the volume of solution drawn from the reservoir 2 into the chamber 3, thus equalizing the pressure within the reservoir 2. In the example of FIG. 1, the chamber 3 has the shape of a capillary tube extending within the reservoir 2 and comprising an outlet portion 8 at the lower end of the chamber 3. The outlet portion 8 comprises a second unidirectional valve 5 allowing passage of the solution out of the chamber 3 through the outlet portion 8 but not in the reverse direction. The upper end of the chamber 3 forms a second connecting portion 9. This preferred configuration allows for decreasing the size of the disposable cartridge 1. Alternatively, the cartridge 1 can also be arranged such that the outlet portion 8 extends from the base of the reservoir 2, outside the latter, and the second connecting portion 9 extends from the top of the reservoir 2.

In an embodiment, the disposable cartridge 1 is made of a two-part housing 12 enclosing the reservoir 2 (one part being visible in FIG. 1). Each part of the two-piece housing 12 can be fastened together using screws (not shown), or using any other convenient fastening method allowing for easy opening of the two parts of the cartridge 1. When open, the reservoir 2 can be attached to or removed from the chamber 3. The two-part housing 12 can be made of plastic-molded parts.

In a preferred variant of the embodiment, the cartridge 1, including the reservoir 2 and the chamber 3, is made as a single piece, for example, a plastic-molded manufacturing process.

The second connecting portion 9 of the chamber 3 is destined to be connected to a pressurizing device (not shown). During a dispensing operation, the pressurizing device applies a reduced pressure within the chamber 3 in order to draw the solution from the reservoir 2, through the first unidirectional valve 4 and into the chamber 3. After a predetermined volume of solution has been retained in the chamber 3, the pressurizing device applies a raised pressure in the chamber 3 and the determined volume of solution flows out of the chamber 3, through the second unidirectional valve 5 and the outlet portion 8.

In an embodiment not represented, the pressure device comprises a pump of the intake and delivery type allowing the chamber 3 to be placed at a raised pressure or at a reduced pressure. The pressure device can further comprise a flow meter for precisely measuring a volume of the solution, for example, with accuracy in the order of a few nanoliters. The pressure device can also comprise a control circuit connected to the pump and to the flow meter, the control circuit controlling the pump according to a volume measured by the flow meter, for example, to activate the pump in order to start drawing the solution into the chamber 3 and deactivate the pump when a determined volume of solution has been drawn into the chamber 3.

Other arrangements of the pressure device are also possible. For example, the pressure device can be an air displacement system including an actuator affecting the movement of a piston, or any other device able to place the capillary tube at a raised or reduced pressure.

In the embodiment of FIG. 1, the second connecting portion 9 comprises a check valve 6 formed from a membrane 21 that is impermeable to liquids but gas permeable. For example, the membrane 21 can be a porous polytetrafluoroethylene membrane that permits the pressurizing device to apply the reduced or a raised pressure within the chamber 3, while avoiding the solution to flow through the check valve 6. Other configurations of the check valve 6 are also possible provided the valve 6 is adapted to allow gas, but not the solution, flowing in and/or out of the chamber 3 via the second connecting portion 9. In such configurations, when the pressurizing device is connected to the disposable cartridge 1 the reduced or raised pressure can be applied within the chamber 3, and when the pressurizing device is disconnected to the disposable cartridge 1 the pressure remains constant within the chamber 3.

In another embodiment also represented in FIG. 1, the check valve 6 further comprises a movable part 10 loaded with a compression spring 17. When the pressurizing device is disconnected from the disposable cartridge 1, the movable part 10 is pushed up by the spring 17 within the second connecting portion 9, the sidewall of the movable part 10 abutting against the inner wall of the second connecting portion 9, blocking the passage to gas. Upon connection of the pressurizing device to the second connecting portion 9, the movable part is moved downward in a section of the second connecting portion 9 having a larger internal diameter than the rest of the connecting portion 9, such that the movable part 10 opens the passage to gas. The movable part 10 can comprise a seal 23, such as an o-ring, in order to insure good sealing. Alternatively, the check valve 6 can be formed from the movable part 10 and the spring 17, without including the membrane 21.

The disposable cartridge 1 disclosed herein does not include the pressurizing device itself or any mechanism for drawing the solution in and out of the chamber 8, and is thus simpler and cheaper than conventional disposable cartridges. The disposable cartridge 1 can be easily connected and disconnected from the pressurizing device while maintaining, if any, the measured volume of solution into the chamber 8, during the process of connecting and/or disconnecting.

In the embodiment of FIG. 1, the first and second unidirectional valves are duck-bill valves made from silicone or any other flexible materials such as rubber or synthetic elastomer. Each of the two duck-bill valves 4, 5 can include two lips (not shown) and an integral base (also not shown) defining a generally cylindrical opening. In the closed position, the lips butt against each other, preventing the passage of the solution. In the open position, the lips respond to positive pressure by spreading apart such as to let the solution flow at a desired pressure.

The unidirectional valves 4, 5 can be any other type of one-way valve, provided the functioning of the valves does not damage components of the solution, such as red cells, when the solution flows through the valves 4, 5. Possible candidate for unidirectional valves 4, 5 typically include diaphragm check valves, swing check valves, clapper valves.

A needle (not shown) can be connected to the outlet portion 8 of the chamber 3. The needle can be replaced, for example, between each dispense operation or can be disposed with the whole cartridge 1. In the latter case, the needle can be fixedly attached to the outlet portion 8, and possibly be made in a single piece with the disposable cartridge 1 itself.

In another variant of the embodiment, the outlet portion 8 does not comprise a needle and the second duck-bill valve 5 is used as an outlet nozzle. Alternatively, the extremity of the outlet portion 8 is tip shaped, the second duck-bill valve 5 being placed in just above, or within, the tip shaped extremity of the outlet portion 8.

The disposable cartridge 1 disclosed herein can be dimensioned for their use in medical assay instrumentation. For example, the disposable cartridge 1 can be adapted to accurately dispense solution volumes in the range comprised between 10 µl and 100 µl. For that purpose, the fixed volume capillary tube 3 can have a volume able to retain a quantity of solution in the range comprised between 10 µl and 100 µl.

A plurality of the disposable cartridges 1 disclosed herein can be used in an apparatus for performing medical assays (not represented). During a dispensing operation, one or more of the disposable cartridges 1 having their reservoir 2 filled with the solution can be displaced from a storage location of the apparatus towards one or several dispensing locations of the apparatus, where dispensing of the solution is to be performed. Each of the disposable cartridges 1 can comprise an information support (not shown), such as a bar code or located on an outer surface of the cartridge 1 or, alternatively, stored in magnetic form or using an RFID tag attached to the disposable cartridge 1. Each of the one or several dispensing locations can comprise a reader (also not shown) for reading information contained in the information support. The reader can be an optical reader for reading the bar code, or include a short range reader circuit for reading the RFID tag.

In an embodiment, the disposable cartridge 1 further comprises an agitating device 7 arranged for agitating the solution comprised within the reservoir 2. For example, in the case the reservoir 2 contains a blood sample comprising blood platelets and serum, the blood platelets can separate from the serum and sediment in the bottom of the reservoir 2 after a period where the sample is not agitated. The agitating device 7 can then be used advantageously to redisperse the blood platelets in the serum.

In the example of FIG. 1, the agitating device is formed from a reciprocating actuator 7 comprising a rod 13 and an excitation device 14. The excitation device 14 is adapted to oscillate the rod 13 linearly, as shown by the double arrow in FIG. 1, and vibrate the reservoir 2 according to the oscillating movement of the rod 13. The rod 13 can be mounted coaxial in a guide 15 fixed on the cartridge housing 12. In the exemplary embodiment of FIG. 1, the rod is a magnetic rod comprising two opposed poles and can be actuated by an excitation coil 14 supplied by an alternating current.

Other configurations of the agitating device 7 are also possible. For example, the rod 13 can be L-shaped and one portion of the rod arranged within the excitation coil 14 such that the other portion is rotated when the excitation device 14 is activated. In an embodiment not represented, the rod 13 is moved by mechanical means, for example, by connecting the rod 13 to a conventional cam arrangement (not shown). Alternatively, the agitating device 7 can be based on sonication, such as an ultrasonic probe.

The disclosure is susceptible to various modifications and alternative forms, and specific examples thereof have been shown by way of example in the drawing and are herein described in detail. It should be understood, however, that the disclosure is not to be limited to the particular forms or methods disclosed, but to the contrary, the disclosure is to cover all modifications, equivalents, and alternatives.

For example, in an embodiment not represented, the reservoir 2 is made of a rigid material and comprises a vent allowing the gas into the reservoir 2 for equalizing the pressure within the reservoir 2 when the reagent is dispensed. The vent can be included in the plug 20. The rigid reservoir 2 can also be formed by the enclosed volume provided by the two-part housing 12. In this latter configuration, fastening the two-piece housing 12 should be provided with a liquid-tight sealing. In the latter configuration, the first unidirectional valve 4 is preferably placed in proximity of the lower wall of the housing 12 with the outlet portion 8 and the second unidirectional valve 5 possibly extending outside the housing 12, in order to maximize the drain of the solution into the chamber 3 and out of the reservoir 2. The inclined shape of the lower wall of the housing 12 as represented in FIG. 1 can further optimize solution draining. The reservoir 2 can also be disposed around the chamber 3, possibly allowing for a more compact geometry of the cartridge 1. The cartridge 1 can also have a cylindrical cross-section. In the latter case, the reservoir 2 can be concentric with the chamber 3, resulting in a compact disposable cartridge 1.

REFERENCE NUMBERS AND SYMBOLS 1 disposable dispensing cartridge
2 reservoir
3 chamber
4 first unidirectional valve
5 second unidirectional valve
6 check valve
7 agitating device
8 outlet portion
9 second connecting portion
10 movable part
11 spout
12 two-piece housing
13 rod
14 excitation coil
15 guide
17 spring
19 first connecting portion
20 plug
21 membrane
23 seal

The invention claimed is:

1. A disposable dispensing cartridge comprising:
a reservoir adapted to contain a solution to be dispensed;
a chamber in fluidic communication with the reservoir through a first unidirectional valve, wherein the first unidirectional valve is positioned between the reservoir and the chamber so that flow of the solution is in a direction out of the reservoir, through the first unidirectional valve, and into the chamber, the chamber comprising an outlet portion located at a first end of the chamber and a second connecting portion located at a second, opposite, end of the chamber, the outlet portion of the chamber comprising a second unidirectional valve allowing passage of the solution in a direction out of the chamber; wherein
the second connecting portion comprises a check valve being arranged to allow gas, but not the solution, to flow in and/or out of the chamber via the second connecting portion; wherein
the outlet portion has an opening communicating with the exterior surface of the disposable dispensing chamber, the second unidirectional valve being positioned in the outlet portion to allow the flow of fluid out of the chamber via the opening of the outlet portion; wherein
the disposable cartridge is removably connectable via the second connecting portion to a pressurizing device, wherein said disposable cartridge comprising the check valve and second connecting portion is mechanically independent of the pressurizing device before said disposable cartridge is removably connected to the pressurizing device, the pressurizing device being adapted to apply a reduced pressure within the chamber, drawing a predetermined volume of solution from the reservoir, through the first unidirectional valve, into the chamber; and to apply a raised pressure within the chamber, drawing the determined volume of solution out of the chamber, through the second unidirectional valve; and wherein
the check valve is exposed to the outside environment before the disposable cartridge is removably connected to the pressurizing device.

2. The disposable cartridge according to claim 1, wherein the check valve comprises a membrane that is impermeable to liquids but gas permeable.

3. The disposable cartridge according to claim 1, wherein the check valve further comprises a movable part loaded with a compression spring being arranged such as to block or open the passage to gas when the pressurizing device is respectively disconnected from, or connected to the disposable cartridge.

4. The disposable cartridge according to claim 1, wherein the reservoir is removably attached to the chamber.

5. The disposable cartridge according to claim 4, wherein the reservoir comprises a spout that can be fitted into a first connecting portion of the chamber to attach the reservoir to the chamber.

6. The disposable cartridge according to claim 5, wherein the first unidirectional valve is comprised in the first connecting portion.

7. The disposable cartridge according to claim 1, wherein the reservoir comprises a flexible portion adapted to be deformed upon said drawing a predetermined volume of solution from the reservoir to equalize pressure within the reservoir.

8. The disposable cartridge according to claim 7, wherein the reservoir is a flexible bag.

9. The disposable cartridge according to claim 1, further comprising an agitating device being arranged for agitating the solution contained within the reservoir.

10. The disposable cartridge according to claim 9, wherein the agitating device comprises an excitation device and a rod excited by the excitation device such as to vibrate the reservoir.

11. The disposable cartridge according to claim 10, wherein the rod is a magnetic rod having two opposed poles and the excitation device is an excitation coil.

12. The disposable cartridge according to claim 11, wherein the rod is T-shaped and one portion of the rod is arranged within the excitation coil such that the other portion is rotated when the excitation device is activated.

13. The disposable cartridge according to claim 1, wherein the first and second unidirectional valves are duck-bill valves.

14. The disposable cartridge according to claim 1, wherein the chamber is a capillary tube.

15. The disposable cartridge according to claim 1, wherein the chamber is adapted to retain a predetermined volume of solution comprised between 10 µl and 100 µl.

16. The disposable cartridge according to claim 1, wherein the flow of the solution is in a direction out of the reservoir, through the first unidirectional valve, and into the chamber, but not in the reverse direction.

* * * * *